F. A. ANTONI.
MANUFACTURE OF INSULATED HANDLES FOR VESSELS AND UTENSILS.
APPLICATION FILED NOV. 23, 1911.

1,067,231.

Patented July 15, 1913.

Witnesses:

Inventor
Friedrich August Antoni,
By B. Singer
Attorney.

UNITED STATES PATENT OFFICE.

FRIEDRICH AUGUST ANTONI, OF COLOGNE-EHRENFELD, GERMANY.

MANUFACTURE OF INSULATED HANDLES FOR VESSELS AND UTENSILS.

1,067,231. Specification of Letters Patent. Patented July 15, 1913.

Application filed November 23, 1911. Serial No. 661,984.

*To all whom it may concern:*

Be it known that I, FRIEDRICH AUGUST ANTONI, subject of the German Emperor, residing at 25 Lichstrasse, Cologne-Ehrenfeld, Germany, have invented certain new and useful Improvements in the Manufacture of Insulated Handles for Vessels and Utensils, of which the following is a specification.

Hitherto the mode of production of insulated handles for vessels has been of such a nature that the metal part of the handle has been made already provided with securing flanges and then covered wholly or partially with incombustible insulating substance. The insulation of the handle has thus been effected after the actual formation of the securing flanges, and it has been necessary to employ an excessively large number of metal handle shapes provided with securing flanges corresponding to the various kinds of vessels and utensils. Moreover, the securing flanges had first to be formed according to the purpose to which each particular vessel was to be applied. So that the modes of production hitherto employed have had the defect that when the insulating material hardened upon the handle to which it was applied a gap occurred between the insulating material and the flange.

According to the present invention metal handle-cores are first covered with incombustible insulating material, which may be softened by heat. For example, a mixture of lacquers and asbestos, adapted to be burned or heated in a kiln. The addition of the necessary flanges or connecting bits being deferred until they are required for the affixing of the handles, by which method the flanges may be adapted to the most various kinds of vessels, while the handles themselves may be made in standard shapes and sizes. This deferring of the affixing or casting on of the handle until it has been provided with an insulating cover has also the advantage that by the casting or sweating on of the flanges the insulating material is warmed and softened against the heated flange so that on cooling both set uniformly together without any gap.

Figure 1:
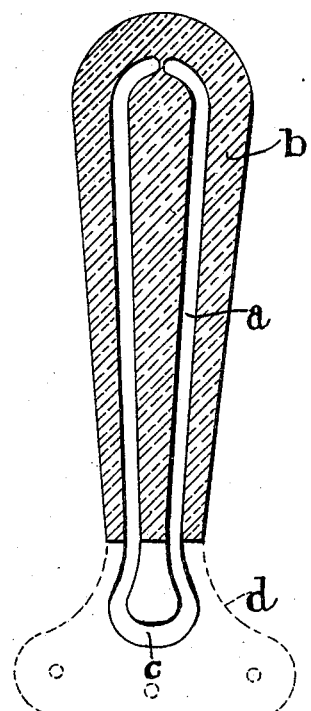
Figure 2:
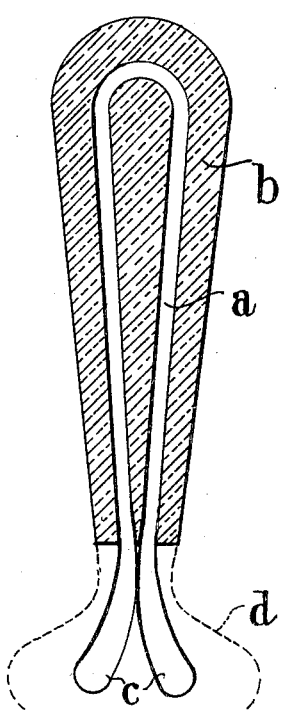
Figure 3:
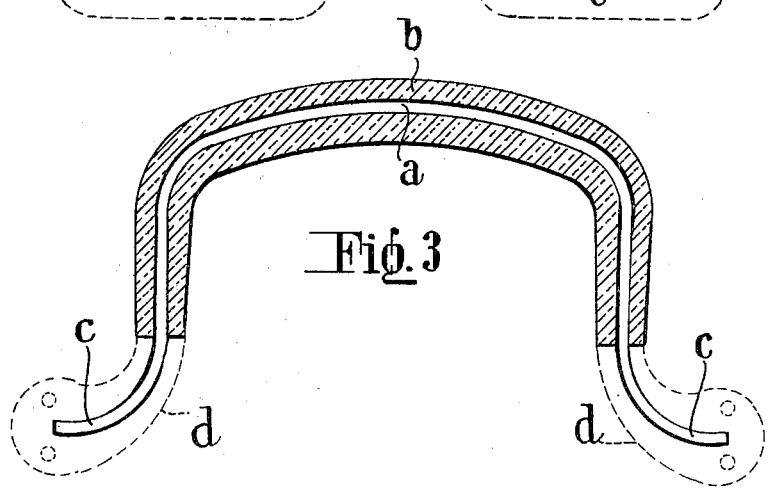

In the drawing are shown by way of example in Figures 1 and 2 a stem handle and in Fig. 3 a bow handle.

The production of the standardized handle-piece is effected by covering the metal core $a$ (which takes a shape corresponding to the handle) with an incombustible insulating mass $b$, so that from the latter the ends $c$ of the core project. The handle pieces thus formed can be made unitedly in large quantities and at the proper time, the securing flanges or connecting bits (broken-lined in the drawing) are cast, welded or sweated on the protruding parts $c$, so that the insulating mass hardens evenly with the heated flanges without any gap at the joint.

The desired form of the securing flanges may be fashioned out of the projecting core part $c$ by pressing, molding or like means. If necessary the ends $c$ are for this purpose thickened or broadened (Fig. 2). Furthermore, knives, fork tines, or other such articles may be applied upon the protruding part $c$ of the insulated handle in place of the flanges $d$.

Claim.

The process of making insulated handles for vessels or other utensils, consisting in covering the body portion of a shaped metal core with insulating material leaving the end or ends of the core uncovered, and then forming on or affixing to said end or ends, by casting, welding or sweating suitable flanges or connecting bits whereby insulating material softened by the heat will set evenly with the heated flanges or bits.

In testimony whereof, I affix my signature in the presence of two witnesses.

FRIEDRICH AUGUST ANTONI.

Witnesses:
 CAMILLA CUIMDERNAN,
 HEINRICH OSTWALD.

Copies of this patent may be obtained for five cents each, by addressing the "Commissioner of Patents, Washington, D. C."